(12) United States Patent
Nishijima et al.

(10) Patent No.: US 8,298,663 B2
(45) Date of Patent: Oct. 30, 2012

(54) PRESSURE-SENSITIVE ADHESIVE SHEET

(75) Inventors: Kenichi Nishijima, Ibaraki (JP); Masato Shirai, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/418,118

(22) Filed: Apr. 3, 2009

(65) Prior Publication Data
US 2009/0252958 A1    Oct. 8, 2009

(30) Foreign Application Priority Data
Apr. 7, 2008    (JP) .................................. 2008-099545

(51) Int. Cl.
*B32B 27/30*    (2006.01)
(52) U.S. Cl. ............. 428/355 BL; 428/343; 428/355 R; 428/356; 428/906; 524/301
(58) Field of Classification Search .................. None
See application file for complete search history.

(56) References Cited

U.S. PATENT DOCUMENTS

| 5,374,377 | A | * | 12/1994 | Nguyen et al. ........... 252/301.36 |
| 5,451,628 | A | | 9/1995 | Baker |
| 5,593,786 | A | * | 1/1997 | Parker et al. .................. 428/426 |
| 7,048,708 | B2 | * | 5/2006 | Evans et al. ...................... 602/76 |
| 2002/0064651 | A1 | * | 5/2002 | Kinoshita et al. ............. 428/343 |
| 2006/0182958 | A1 | * | 8/2006 | Okochi et al. ........... 428/355 AC |
| 2007/0167546 | A1 | * | 7/2007 | Yatagai et al. ................ 524/270 |

FOREIGN PATENT DOCUMENTS

| GB | 635127 | 4/1950 |
| JP | 2003-119300 A | 4/2003 |
| JP | 2003-119301 A | 4/2003 |
| JP | 2004-115767 A | 4/2004 |

* cited by examiner

*Primary Examiner* — Callie Shosho
*Assistant Examiner* — Cheng Huang
(74) *Attorney, Agent, or Firm* — Leydig, Voit & Mayer, Ltd.

(57) ABSTRACT

Provided is a PSA sheet comprising a PVC film (support) provided with PSA layer formed of an aqueous dispersion-type PSA composition, which exhibits a smooth unwinding motion. The PVC film can be obtained by molding a PVC composition comprising PVC and a metal soap. The metal soap comprises an alkali earth metal soap and zinc soap. At least part of the alkali earth metal soap is a stearate and at least part of the zinc soap is zinc laurate.

19 Claims, 1 Drawing Sheet

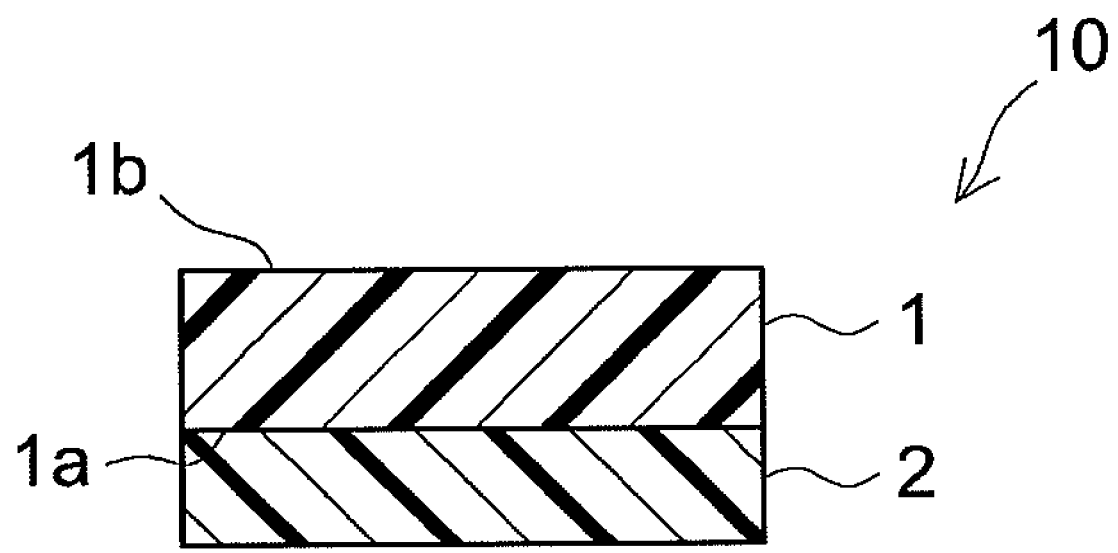

PRESSURE-SENSITIVE ADHESIVE SHEET

BACKGROUND OF THE INVENTION

1. Field of the Invention

The present invention relates to a pressure-sensitive adhesive (PSA) sheet comprising a PSA layer formed of an aqueous dispersion-type PSA composition applied to a polyvinyl chloride film as a support (backing).

This application claims priority based on Japanese Patent Application No. 2008-099545 filed on Apr. 7, 2008 and the entire content of the application is incorporated herein as reference.

2. Description of the Related Art

PSA sheets prepared by applying a PSA layer to a film substrate (support) of processed polyvinyl chloride (PVC), because of the easy handling, has been widely used for various purposes such as electric insulation, packing, protection and so forth. Examples of documents describing the related art of using a PVC film as a backing include Japanese Patent Application Publication Nos. 2003-119300, 2003-119301, and 2004-115767.

SUMMARY OF THE INVENTION

PVC, which is used to form the film substrate, tends to become discolored; and tends to degrade in physical, mechanical or electrical properties, by chemical reactions induced by physical energies such as heat, ultraviolet light, shear force, etc. Thus, in preparing film substrates (typically rolling with a calendar roll), in order to prevent or suppress the chemical reactions to cause the degradation, a molding material (can be referred to as a "film-forming composition" or a "PVC composition") prepared by adding one, two or more kinds of stabilizer to PVC is used. The selection of stabilizer (for instance, a metal stabilizer) and its amount to be used are important factors to affect the moldability (ease of rolling, etc). As the stabilizer, because of recent tendencies to avoid lead-based stabilizers, for instance, lead-free metal soap such as zinc/calcium-based soap is preferably used. Typical examples of the metal soap include metal salts of stearic acid.

A roll of a PVC film-backed PSA sheet is produced by providing a PSA layer to a first side of such a film substrate (PVC film) and rolling the resultant so as to bring the surface (adhesive face) of the PSA layer to come in contact with a second side (the side opposite to the first side provided with a PSA layer) of the film. The PSA sheet roll is constructed such that when unwound (i.e., when unrolled), it responds adequately (unwinds smoothly) because of the nature (adhesiveness toward the second side of the film, etc.) of the PSA. That the PSA sheet roll shows an adequate response (a smooth unwinding motion) to unwinding action is desirable in view of handling ease (such as ease in binding electrical cords, etc.) of the PSA sheet and so on.

On the other hand, aqueous dispersion-type (aqueous) PSA composition in which PSA components are dispersed in water is preferred to solvent-type counterparts in view of environmental concerns because water is used as the dispersion medium. Therefore, for various PSA compositions, shifting from solvent-types to aqueous dispersion-types has been tried. In producing PVC film-backed PSA sheets, there has been a desire to convert the PSA compositions to water-dispersion-types while maintaining the level of performance achieved in conventional PSA sheets having a PSA layer of a solvent-type PSA composition.

In the PVC film-backed PSA sheet roll however, when the PSA composition to form the PSA layer is changed to a water-dispersion type, the unwinding facilitation (especially under a low-temperature environment) tends to be compromised. For instance, disadvantages would arise in the PSA sheet, such as insufficient unwinding facilitation, uneven (unstable) unwinding, and so on.

An objective of the present invention is thus to provide a PSA sheet with a smooth unwinding motion, comprising a PSA film (support) provided with a PSA layer formed of a water-dispersion type PSA composition. A related objective is to provide a support (PVC film) suitable as a constituent of this PSA sheet.

The present inventors have found out that the phenomenon of bleeding of lead-free metal soap stabilizer into the surface of a PVC film causes compromise the smooth unwinding motion. They have achieved the present invention by finding out that prescribed mixed metal salts of different acids can be used as the lead-free metal soap to obtain a PVC film with which the bleeding phenomenon is greatly suppressed; and that with a PSA sheet backed with this PVC film, even when an aqueous dispersion-type PSA composition is used to form the PSA layer, the resulting PSA sheet shows a smooth unwinding.

The present invention provides a PSA sheet (typically a tape) comprising a PVC film provided with a PSA layer (typically formed of an aqueous dispersion-type PSA composition). The PVC film is obtained by molding a PVC composition comprising PVC and metal soap. The metal soap comprises alkali earth metal soap and zinc soap. Here, at least part of the alkali earth metal soap is an alkali earth metal salt of stearic acid and at least part of the zinc soap is zinc laurate The bleeding of metal soap into the PVC film surface (aggravated by heat during the rolling process and coating/drying of the PSA composition) can be avoided by simply decreasing the amount of metal soap to be admixed. However, when the amount of metal soap is decreased too much, the stabilizing effect of the metal soap may not be sufficient and the PVC film may be degraded during the processes of film molding and so on. Because the metal soap not only stabilizes the PVC, but also facilitates the rolling process (rollability), when the amount of metal soap is too low, the rolling process will be hindered due to the degraded facilitation.

The PVC film used as a support of the PSA sheet of the present invention is prepared by molding a PVC composition comprising both an alkali earth metal salt of stearic acid (for instance, calcium stearate) and zinc laurate. By using such prescribed mixed metal soap, while maintaining the rolling facilitation, the bleeding of the metal soap can be greatly suppressed. Therefore, a PSA sheet comprising this PVC film provided with a PSA layer formed of an aqueous dispersion-type PSA composition will show a smooth unwinding motion. In other words, with the mixed metal soap, the moldability (rolling facilitation) in forming a PVC film from the PVC composition and the smooth unwinding motion can be brought about both at the same time.

The PVC composition is preferred to contain, relative to 100 parts by mass of PVC contained therein, about 0.3 to 3.5 parts by mass (more preferably about 0.4 to 2.5 parts by mass) in total of the mixed metal soap. With a PVC composition of this sort, a higher level of moldability in the PVC film and a smooth unwinding motion in the PSA sheet backed therewith can be achieved both at the same time.

The PVC composition is preferred to contain, relative to 100 parts by mass of PVC contained therein, about 0.15 to 2 parts by mass (more preferably about 0.2 to 1.5 parts by mass) in total of zinc soap. With a PVC composition of this sort, a higher level of moldability in the PVC film and a smooth unwinding motion in the PSA sheet backed therewith can be achieved both at the same time.

In a preferred embodiment, zinc laurate amounts to at least about 30 mass % (typically about 30 to 100 mass %; for instance, about 50 to 100 mass %) of the total zinc soap contained in the PVC composition. With a PVC film obtained from a PVC composition of this sort, can be constituted a PSA sheet with a smoother unwinding motion. Essentially all of the zinc soap contained in the PVC composition can be zinc laurate.

In a preferred embodiment, an alkali earth metal salt of stearic acid amounts to at least about 50 mass % (typically about 50 to 100 mass %) of the total alkali earth metal soap contained in the PVC composition. A PVC composition of this sort brings about greater moldability for the PVC film production. Essentially all of the alkali earth metal soap contained in the PVC composition can be a stearic acid salt.

Preferably, all stearic acid salts amount to about 30 to 90 mass % of the total metal soap contained in the PVC composition. With a PVC composition of this sort, a higher level of both moldability in the PVC film and a smooth unwinding motion in the PSA sheet backed therewith can be achieved both at the same time.

In a preferred embodiment, the PVC composition further comprises hydrotalcite. Hydrotalcite can be an effective stabilizer for PVC. Thus, with a PVC composition comprising hydrotalcite in addition to the metal soap, the stabilizing effect (in other words, the effect to prevent PVC degradation) can be greatly increased.

The aqueous dispersion-type PSA composition is preferably composed of a rubber-based polymer as a base polymer (a primary component of all polymer components). For instance, a PSA composition comprising natural rubber latex and styrene-butadiene rubber latex is preferred. A PSA sheet comprising a PSA layer formed of such a rubber-based PSA composition can maintain the ability to provide a smooth unwinding motion over a long period of time because of the well-stabilized adhesive properties.

The present invention provides a PSA sheet support formed of a PVC film. The PVC film is produced by molding a PVC composition comprising PVC and metal soap. The metal soap comprises alkali earth metal soap and zinc soap. At least part of the alkali earth metal soap is an alkali earth metal salt of stearic acid and at least part of the zinc soap is zinc laurate. The PSA sheet support can be suitably used, for example, as a support to constitute any of the afore-mentioned PSA sheets.

BRIEF DESCRIPTION OF THE DRAWINGS

FIG. 1 schematically illustrates a cross section of a configuration of the PSA sheet of the present invention.

DETAILED DESCRIPTION OF THE DRAWINGS

Hereinafter, preferred embodiments according to the present invention will be described. The matter which is other than that specifically referred to in this specification, but is necessary for carrying out the present invention, may be understood as a matter of design choice for those skilled in the art based on the conventional art. The present invention can be carried out based on the contents disclosed in this specification and the technological common knowledge in the art.

The PSA sheet according to the present invention comprises a PVC film support, and a PSA layer backed by the support. FIG. 1 shows an example of a typical configuration of this PSA sheet. A PSA sheet 10 has a configuration such that a PSA layer 2 is provided to a first side 1a of a support (PVC film) 1. In the PSA sheet 10 prior to use (i.e., before it is adhered to an adherend), because it is rolled up, the surface (adhesive face) of the PSA layer 2 is in contact with a back side 1b of the support 1 so that the surface is protected.

The PVC film support is prepared by molding into a film a PVC composition (molding material) containing prescribed components. Here, the term PVC composition refers to a resin composition wherein PVC is a primary component (i.e., at least 50 mass %) of all resin components (polymer components). Preferably, PVC amounts to at least about 80 mass % (more preferably at least about 90 mass %) of the total resin components contained in the PVC composition. Essentially all of the resin components can be PVC. With a PVC composition of this sort, can be prepared a PVC film (typically a film of soft PVC resin) with properties suitable for a PSA sheet support.

The PVC contained in the PVC composition can be various polymers composed of vinyl chloride as a primary monomer (the primary component of all monomer components; i.e., the monomer that amounts to 50 mass % or greater). That is, the concept of PVC herein encompasses copolymers of vinyl chloride and various co-monomers besides homopolymers of vinyl chloride. Examples of the co-monomers include vinylidene chloride; olefins (preferably olefins with 2 to 4 carbon atoms) such as ethylene, propylene and the like; carboxyl-group-containing monomer such as acrylic acid, methacrylic acid (hereinafter, acryl and methacryl are collectively referred to as "(meth)acryl"), maleic acid, fumaric acid, etc. and anhydrides thereof (anhydrous maleic acid, etc.); (meth) acrylic acid ester, for instance, an ester of (meth)acrylic acid and an alkyl alcohol or a cycloalkyl alcohol with 1 to 10 carbon atoms; vinyl ester-based monomer such as vinyl acetate, vinyl propionate and the like; styrene-based monomers such as styrene, substituted styrenes (α-methylstyrene, etc.), vinyl toluene and the like; acrylonitrile; and so on. As for the copolymers, the co-polymerization ratio of vinyl chloride is preferably 70 mass % or greater (more preferably, 90 mass % or greater). These monomers are polymerized by a suitable method (typically by suspension polymerization) to obtain PVC.

Though not particularly limited to, the average polymerization degree of PVC to be contained in the PVC composition may be, for instance, about 800 to 1500. In view of workability (moldability), etc., the polymerization degree of the PVC composition is preferred to be within a range of about 1000 to 1300.

The PVC composition comprises, as the stabilizer, at least alkali earth metal soap and zinc soap. The alkali earth metal soap can be of, for instance, one, two or more kinds selected from calcium (Ca), barium (Ba), and magnesium (Mg) salts of fatty acids. In terms of the cost and availability, a Ca salt and/or a Ba salt are preferably used, and in terms of easy handling, a Ca salt is especially preferred. For example, it is preferable that 50 mass % or greater (more preferably 75 mass % or greater; for instance, essentially all) of the alkali earth metal soap contained in the PVC composition is of a Ca salt and/or a Ba salt.

In the technology disclosed herein, at least part of the alkali earth metal soap is a stearic acid salt. Preferably, the stearic acid salt amounts to at least 50 mass % (more preferably at least 75 mass %) of the total alkali earth metal soap contained in the PVC composition. Essentially all of the alkali earth metal soap can be a stearic acid salt. With alkali earth metal soap composed primarily of a stearic acid salt, even when used in a relatively small amount, sufficient effects (stabilization, rolling facilitation, etc.) can be obtained. This is desirable in suppressing the bleeding as well.

The amount of an alkali earth metal salt of stearic acid (for instance, calcium stearate) in the PVC composition can be, relative to 100 parts by mass of PVC contained therein, for example, about 0.1 to 4 parts by mass. Usually, it is preferred to be about 0.15 to 3 parts by mass (for instance, about 0.2 to 2 parts by mass). When the amount of an alkali earth metal salt of stearic acid is exceedingly lower than this range, the stabilizing effect may be insufficient and degradation of physical properties during the molding, etc. of the PVC film may be more likely to occur. In addition, the rolling facilitation may be degraded thereby hindering the film molding process. On the other hand, when the amount of an alkali earth metal salt of stearic acid is exceedingly greater that the above range, the metal soap tends to bleed into the PVC film surface and the smoothness in unwinding motion and other adhesive properties of the PSA sheet are likely to decrease.

In case where part of the alkali earth metal soap is a salt of any other fatty acid than stearic acid, the other fatty acid can be one, two or more kinds selected from saturated or unsaturated fatty acids having about 12 to 20 carbon atoms such as lauric acid, ricinoleic acid and the like. The amount of the alkali earth metal salt of the other fatty acid (for instance, lauric acid salt), (when two or more kinds are contained, their combined amount) is preferred to be less than that of the alkali earth metal salt of stearic acid; and further when combined with the stearic acid salt, their total amount is preferred not to exceed the desirable range for the stearic acid salt described above. The PVC composition may contain essentially no alkali earth metal salt of any other fatty acid than that of stearic acid.

In the technology disclosed herein, at least part of the zinc soap is zinc laurate. The amount of the lauric acid salt in the total zinc soap, which is contained in the PVC composition, is preferably about 30 mass % or greater and more preferably about 50 mass % or greater. In order to obtain a PSA sheet with a smoother unwinding motion, at least about 75 mass % of the zinc soap contained in the PVC composition is preferred to be the lauric acid salt. Essentially all of the zinc soap contained in the composition can be the lauric acid salt.

The amount of zinc soap in the PVC composition can be, relative to 100 parts by mass of PVC contained therein, about 0.01 to 4 parts by mass. Usually, it is preferred to be about 0.2 to 3 parts by mass (for instance, about 0.3 to 2 parts by mass). When the amount of zinc soap is exceedingly lower than this range, the stabilizing effect may be insufficient and degradation of physical properties during the molding, etc. of the PVC film may be more likely to occur. In addition, the rolling facilitation may be degraded thereby hindering the film molding process. On the other hand, when the amount of zinc soap is exceedingly greater that the above range, the metal soap tends to bleed and the smoothness in unwinding motion and other adhesive properties of the PSA sheet are likely to decrease.

When a zinc salt of any other fatty acid than lauric acid is used as part of the zinc salt, the other fatty acid can be one, two or more kinds selected from saturated or unsaturated fatty acids having about 12 to 20 carbon atoms such as stearic acid, ricinoleic acid and the like. The amount of the zinc salt of the other fatty acid (when more than two kinds are contained, their total amount) is preferred to be at most about 2.3 times the amount of zinc laurate. The method wherein, in addition to zinc laurate, a different fatty acid salt (for instance, zinc stearate) is used as the zinc soap can be preferably applied, for example, to increase the moldability (rolling facilitation, etc.) while maintaining the anti-bleeding ability (further, the smooth unwinding motion) at a practically sufficient level.

It is noted that the PVC composition may further comprise other metal soap (typically a stearic acid salt) than alkali earth metal soap and zinc soap. However, the PVC composition is preferred to contain essentially no lead soap and is more preferred to contain essentially no lead-containing substance of any form.

The total amount of the metal soap contained in the PVC composition can be, relative to 100 parts by mass of PVC contained therein, for instance, about 0.2 to 5 parts by mass. In order to bring both the moldability of the PVC film and the smoothness in unwinding motion of the PSA sheet backed therewith to higher levels, the total amount is preferably about 0.3 to 3.5 parts by mass (more preferably about 0.4 to 2.5 parts by mass; for instance, about 0.5 to 2.5 parts by mass). The total amount of the metal soap can be, for example, about 0.7 to 2 parts by mass.

The total amount of the metal stearate (when stearates of an alkali earth metal and any other metal are contained, their combined amount) contained in the PVC composition can be, relative to 100 parts by mass of PVC, for instance, about 0.1 to 4 parts by mass and is preferred to be about 0.2 to 3 parts by mass (for example, about 0.3 to 2 parts by mass). When the total amount of the stearate is exceedingly less than the above range, the stabilizing effect may be insufficient or the rolling facilitation of the PVC composition may be degraded. On the other hand, the amount of the stearate is exceedingly more than the above range, the metal soap bleeding may take place. The stearate preferably amounts to about 30 to 90 mass % (more preferably 40 to 80 mass %) of the total metal soap contained in the PVC composition. With this PVC composition, a higher level of the moldability in the PVC film and a smooth unwinding motion in the PSA sheet backed therewith can be achieved both at the same time.

The PVC composition of the technology disclosed herein further comprises typically a plasticizer in addition to PVC and metal soap. As for the plasticizer, can be used without any particular limitation various materials known to bring about plasticization of PVC. For example, various plasticizers that have been used conventionally in the field of the PVC film can be preferably used. More specifically, can be used phthalic acid esters such as dioctyl phthalate (di-2-ethylhexyl phthalate, di-n-octyl phthalate), dinonyl phthalate, diisononyl phthalate, diisodecyl phthalate and the like; preferably esters of phthalic acid and an alkyl alcohol having 1 to 12 carbon atoms; trimellitic acid esters such as tris (2-ethylhexyl)trimellitate; adipic acid esters of di-2-ethylhexyl adipate and the like; and so on. Other examples include polyester plasticizers such as polycondensation products (preferably those of less than 1500 in number average molecular weight) of a dicarboxylic acid (typically an aliphatic dicarboxylic acid such as adipic acid, etc.) and a glycol, etc.; chlorinated polyolefins; and the like. These plasticizers can be used solely or in combination of two or more kinds. The amount of the plasticizer to be used is not particularly limited and can be for instance about the same amount as a typical amount used in the field of soft PVC resin (especially the PVC film for the PSA sheet support). A desirable example is a PVC composition containing a plasticizer at about 20 to 100 parts by mass (more preferably about 30 to 70 parts by mass) relative to 100 parts by mass of PVC.

The PVC composition may further comprises hydrotalcite as a stabilizer besides the metal soap described above. Hydrotalcite is typically a basic magnesium aluminum carbonate of an unfixed component ratio, which is represented by the following formula: $Mg_{1-x}Al_x(OH)_2(CO_3)_{x/2} \cdot mH_2O$, usually within the ranges $0<x\leqq0.33$ and $0<m\leqq0.5$. Hydrotalcite is commercially available and highly accessible. The amount of hydrotalcite to be used can be about 10 parts by mass or less relative to 100 parts by mass of PVC, and is preferably about 5 parts by mass or less (more preferably 2 parts by mass or less). When this amount is too much, discoloration of the PVC film may develop. The lower limit for this amount is not particularly set, but it is typically suitable to be at least 0.1 part by mass. As far as the effects of the invention are not significantly degraded, the PVC composition may contain other stabilizers (tin-based stabilizers, etc. but excluding lead-based ones).

The PVC composition may contain as necessary various materials conventionally known as additives to PVC resins (especially, PVC films to be used as PSA sheet supports) besides the essential and optional components described above. For instance, additives such as colorants such as pigments and dyes, photostabilizers, antioxidants, UV absorbers, modifiers, fillers, flame retardants, antistatic agents, mildewcides, lubricants, etc. can be appropriately admixed.

PVC films used as PSA sheet supports can be obtained by molding into films a PVC composition such as the one describe above. Typically, the PVC film can be produced by mixing components of the PVC composition and subjecting the mixture to rolling process (calendar process) by a calendar roll. The thickness of the PVC film is not particularly limited and can be appropriately selected in accordance with the purpose of the PSA sheet. For instance, the thickness can be preferably about 10 μm to 300 μm (more preferably 30 μm to 300 μm).

The PVC film may be further subjected to a decorating process such as printing. The face of the film to be provided with a PSA layer can be subjected as necessary to surface treatments such as primer coating, corona discharge treatment, etc.

In the technology disclosed herein, an aqueous dispersion-type PSA composition is used to form a PSA layer on a PVC film (support). The PSA composition can be a water dispersion of a suitable polymer such as rubber-based, acrylic, etc. Because PSA is less likely to soften on a PVC film support of a composition containing a large amount of plasticizer, especially preferred is a rubber-based PSA composition (i.e., the primary polymer component is a rubber-based polymer). For instance, an aqueous dispersion-type PSA composition prepared by admixing a tackifier and other additives as necessary to rubber latex can be used preferably.

The rubber latex can be a water dispersion of a variety of known rubber-based polymers. Any of natural and synthetic rubber latex can be used. Examples of the synthetic rubber latex include styrene-butadiene rubber latex (SBR latex), chloroprene latex, and the like. As for the natural rubber latex, for instance, various known materials used in aqueous dispersion-type PSA compositions can be used without any particular limitation. It may or may not be depolymerized. Natural rubber latex here is not limited to unmodified kind, but can be natural rubber latex modified with, for example, an acrylic acid ester, etc. Unmodified and modified natural rubber latex can be used in combination. With respect to the synthetic rubber latex (SBR latex, chloroprene latex, etc.), commercially-available products for PSAs and the like can be used without any particular limitation. Any of unmodified and modified (for example, carboxylated) synthetic rubber latex can be used. These rubber latexes can be used solely or in combination of two or more kinds.

In a preferred embodiment, the aqueous dispersion-type rubber-based PSA composition comprises natural rubber latex and SBR latex. With a PSA composition of this sort, can be formed a PSA sheet of excellent adhesive properties and so on, suitable for purposes such as binding electrical cords, pipes, etc; electric insulation; and the like. The mass ratio of the natural rubber latex to SBR latex (natural rubber latex: SBR latex) with respect to the non-volatiles is preferably in a range of about 10:90 to 90:10, more preferably about 20:80 to 80:20, and yet more preferably about 30:70 to 70:30.

As for the tackifier, a suitable one can be used, selected from various conventional tackifier resins. For instance, one, two or more kinds can be selected from various tackifier resins such as rosins, rosin derivatives, petroleum-based resins (C5s, C9s, etc.), terpene-based resins, ketone-based resins, and the like. Examples of the rosin resins include rosins such as gum rosin, wood rosin, tall oil rosin, etc; stabilized rosins (which can be obtained by, for instance, disproportionation or hydrogenation of rosins); polymerized rosins (for example, multimers of rosins; typically dimers), modified rosins (for instance, rosins modified by an unsaturated acid, etc. such as maleic acid, fumaric acid, (meth)acrylic acid, and so forth.); and so on. Examples of the rosin derivatives include esterified products of rosin resins as well as phenol-modified rosin resins and esterified products thereof. Examples of the petroleum-based resins include aliphatic, aromatic, co-polymeric, and alicyclic petroleum-based resins; hydrogenated products thereon and the like. Examples of terpene-based resins include α-pinene resins, β-pinene resins, aromatic terpene resins, terpene phenol resins, and the like. Examples of the ketone-based resins include ketone-based resins obtained by condensation of ketones (for instance, aliphatic ketones such as methyl ethyl ketone, methyl isobutyl ketone, acetophenone, and the like; and alicyclic ketones such as methyl cyclohexanone and the like) and formaldehyde.

The ratio of the tackifier to the polymer components (preferably rubber-based polymers) in the PSA composition can be appropriately selected in accordance with the purpose. Usually, with respect to the non-volatiles, relative to 100 parts by mass of polymer components, about 20 to 150 parts by mass (preferably about 30 to 100 parts by mass) of tackifier can be suitably contained in the composition. When the amount of tackifier is too low, the resulting PSA tends to have low adhesiveness. On the other hand, when the tackifier emulsion content is much greater than the above range, the smoothness in unwinding motion (especially at a low temperature) may be reduced.

The PSA composition may further comprises as necessary various additives generally used in the field of the aqueous dispersion-type PSA composition such as thickening agents (viscosifiers, etc), leveling agents, plasticizers, softeners, fillers, colorants such as pigments and dyes, photostabilizers, anti-aging agents, antioxidants, water-proofing agents, antistatic agents, foaming agents, defoaming agents, surfactants, preservatives, crosslinking agents, and so on.

The PSA layer can be formed by the same way as known methods for forming PSA layers in PSA sheets. For instance, the PSA composition can be directly applied (typically by coating) to a first side of a PVC film support (direct method). The PSA composition can be applied to and dried on a surface of a release liner to form a PSA layer thereon and the resulting PSA layer can be transferred to a PVC film (transfer method). The PSA composition can by applied by conventional coaters such as gravure roll coater, reverse roll coater, comma direct coater kiss roll coater, dip roll coater, bar coater, knife coater, spray coater and the like. Though not particularly limited to, but the thickness of the PSA coating can be, in terms of the dried thickness, for instance, about 2 μm to 150 μm (typically about 5 μm to 100 μm; for example about 10 μm to 80 μm).

The PSA layer is typically continuous, but depending on the purpose and application, can be in a regular or random pattern of dots, stripes, etc.

The PVC film disclosed herein comprises prescribed mixed metal soap (stabilizer), the soap comprising an alkali earth metal salt of stearic acid (for instance, Ca stearate) and zinc laurate; and therefore, while the moldability (rolling facilitation, etc.) of the film is maintained, the bleeding of the metal soap into the film surface is greatly suppressed. A low-bleeding PVC film such as this may exhibit a proper peeling motion (smooth unwinding motion) when the PSA sheet is removed from the PVC film surface (for instance, when the PSA sheet roll is unrolled). Proper peeling action can be brought about even in case where the PSA layer on the PSA sheet is of an aqueous dispersion-type. The PSA sheet provided by this invention may exhibit proper peeling action at a wide range of temperatures (for instance, in a low-temperature environment where the resistance against unwinding force tends to decrease; for instance in an environment at 10° C. or lower).

The technology disclosed herein can be suitably applied to a PSA sheet roll which is unwound for use (typically a long strip of a PSA sheet; i.e., a PSA tape). For instance, it is suitable for a PSA sheet to bind electrical cords (wire harnesses, etc.) and pipes. Because of the smooth unwinding motion, the PSA sheet has an advantage of easy handling (e.g., easy tightening) in the binding application The PSA sheet provided by this invention is not limited to the binding application and can be used desirably as a PSA sheet used in various fields where PVC film-backed PSA sheets are used, such as electric insulation, protection of wire harnesses (vehicle wire harnesses, etc.) and pipes, interlayer or surface insulation of electrical and electronic parts, labels and classifications, etc.

To carry out this invention, it is not necessary to elucidate why the issues of concern can be resolved with the mixed metal soap, but it can be considered as follows. That is, typical lead-free metal soap used as a stabilizer in PVC compositions has been a stearate; the present inventors found out that the acid component of the metal soap can be changed from stearate to laurate to suppress the bleeding; this might be related to that the laurate soap is more compatible with PVC than the stearate soap; however, when all of the metal soap is converted from stearate to laurate, the stabilizing effect and the moldability are reduced; and when the amount of laurate soap is increased to make up the reduction, the bleeding intensifies; and therefore, it was not possible with a composition comprising metal soap of a single fatty acid to bring about practical levels of both moldability and anti-bleeding effect (further, smooth unwinding motion).

It is considered that with the composition of this invention, while the moldability can be brought about by using a combination of metal salts of different acids (stearic acid and lauric acid) and further by using a stearcic acid salt as the alkali earth metal soap, high levels of moldability and anti-bleeding effect (smooth unwinding motion) can be realized by using zinc laurate, which is less likely to cause bleeding, as at least part of the zinc soap. It can be inferred that issues in unwinding of a PSA sheet are more likely to occur in a PSA layer prepared with an aqueous dispersion-type PSA composition than in one with a solvent-type counterpart because, in general, an aqueous dispersion-type PSA composition tends to contain more low-molecular-weight compounds such as surfactant (emulsifier), and the like relative to a solvent-type counterpart. It may be because properties of such a PSA layer containing surfactant, etc are more likely to be affected by the presence of low-molecular-weight compounds (for instance, metal soap bled into the surface).

EXAMPLES

Hereinafter, some examples according to the present invention will be described, but the present invention is not limited to these specific examples. In the following description, the "part(s)" and "%" are based on mass unless otherwise specified.

Example 1

To form a PVC composition, were mixed 100 parts polyvinyl chloride (product name "TH-1300" from Shin-Etsu Chemicals), 54 parts dioctyl phthalate (product name "DOP" from Kao Corporation), 0.5 part zinc laurate (Mitsuwa Chemicals Co., Ltd) as the zinc soap, 0.5 part calcium stearate (Kishida Chemicals Co., Ltd) as the alkali earth metal soap, and 2 parts hydrotalcite (product name "ALKAMIER" from Kyowa Chemical Industry Co., Ltd.). The resulting PVC composition was molded to a film of 100 µm thickness at a temperature of 150° C. using a calendar molding machine to obtain a PVC film of Example 1.

To prepare an aqueous dispersion-type rubber-based PSA composition, were mixed 60 parts SBR latex (product name "Nipol LX426" from ZEON CORPORATION), 40 parts natural rubber latex (product name "HYTEX HA" from GOLDEN HOPE), 120 parts petroleum resin emulsion (as is) and 1 part dibutylhydroxytoluene (BHT) as antioxidant. The petroleum resin emulsion was prepared by dissolving 75 parts petroleum resin (product name "Escorez1202" from Exxon-Mobil Chemical, softening point 100° C.) in 25 parts toluene, admixing 3.5 parts emulsifier (product name "Emulgen 920" from Kao Corporation) and 46.5 parts water and emulsifying the resulting mixture by a homomixer.

To a first side of a first PVC film (support) of Example 1, the PSA composition was coated to a dried thickness of 30 µm using a comma-direct coater and dried to form a PSA layer on the support. The PSA layer on the support was adhered to a second PVC film of Example 1 to obtain a PSA sheet of Example 1.

Example 2

Except that 0.25 part zinc laurate and 0.25 part zinc stearate (Kishida Chemicals Co., Ltd.) were used as the zinc soap, a PVC film of Example 2 was prepared in the same way as Example 1. The first PVC film of Example 2 was coated with the same PSA composition as above, and adhered to a second PVC film of Example 2 to obtain a PSA sheet of Example 2.

Examples 3 and 4

Except that the amount of the zinc soap used were 0.05 part for Example 3 and 3 parts for Example 4, corresponding PVC films of Examples 3 and 4 were prepared in the same way as the Example 1. These first PVC films were coated with the same PSA composition as above, and adhered to second PVC films to obtain PSA sheets of Examples 3 and 4.

Example 5

In this example, as the zinc soap, 0.5 part of zinc stearate was solely used (that is, no zinc laurate was used). Otherwise, a PVC film of Example 5 was prepared in the same way as Example 1. The first PVC film of Example 5 was coated with the same PSA composition as above, and adhered to a second PVC film of Example 5 to obtain a PSA sheet of Example 5.

Each of the PSA sheets obtained in Examples 1 to 5 was cut to 19 mm width to prepare a test piece (PSA tape). The test pieces were subjected to the following evaluations.

SUS Adhesive Strength

In an environment at a temperature of 23° C. and 65% RH, the second PVC film (which was adhered to the sheet after the formation of a PSA layer) was removed from a first test piece and the first test piece was bonded to a SUS304 stainless steel plate adherend by pressing with a 2-kg roller back and force once. This was stored in the same environment for 30 minutes. Subsequently, according to JIS Z0237, SUS adhesive strength was measured in N/19 mm at a pulling speed of 300 mm/min and a peeling angle of 180°.

Backside Adhesive Strength

For each Example, the second PVC film was removed from a second test piece and the second test piece was bonded to the SUS304 stainless steel plate to prepare an adherend. In an environment at a temperature of 23° C. and 65% RH, the second PVC film was removed from a third test piece and the third test piece was bonded over the second test piece of the adherend. Otherwise, adhesive strength of each PSA sheet with respect to the backside of itself (i.e., the backside of the PVC film support of the PSA sheet of each Example) was measured in N/19 mm in the same way as the SUS adhesive strength.

Peeling at a Low Temperature

A test piece prepared as above was stored in an environment at 0° C. for 2 hours and in the same environment, an examiner hand-peeled the second PVC film from the PSA layer on the support into the direction that makes about a 90° angle with the PSA layer and evaluated the peeling motion felt by the hand. Table 1 shows the results where E (excellent) indicates desirable, stable resistance against the peeling force; G (good) indicates practically sufficient, stable resistance; U indicates practically sufficient, but unstable (making a light paper-tearing noise) resistance; and P indicates poor resistance to cause undesirably excessive peeling.

Table 1 shows the results of the above evaluations. The Table also includes PVC compositions of Examples 1 to 5. Further, for each Example, the rolling facilitation during the molding process of the PVC composition is evaluated to 5 ranks of 1 to 5 where the larger the number, the better the rolling facilitation. It is noted that no discoloration or degradation in PVC was observed in any of Examples 1 to 5.

TABLE 1

|  | Ex. 1 | Ex. 2 | Ex. 3 | Ex. 4 | Ex. 5 |
| --- | --- | --- | --- | --- | --- |
| Composition (parts) | | | | | |
| PVC | 100 | 100 | 100 | 100 | 100 |
| DOP | 54 | 54 | 54 | 54 | 54 |
| Zn stearate | — | 0.25 | — | — | 0.5 |
| Zn laurate | 0.5 | 0.25 | 0.05 | 3 | — |
| Ca stearate | 0.5 | 0.5 | 0.5 | 0.5 | 0.5 |
| hydrotalcite | 2 | 2 | 2 | 2 | 2 |
| Evaluation results | | | | | |
| Rolling facilitation | 4 | 5 | 2 | 5 | 5 |
| SUS adhesive strength | 3.5 | 3.5 | 3.5 | 3.5 | 3.5 |
| Backside adhesive strength | 4.1 | 4.9 | 4.4 | 3.3 | 2.5 |
| Peeling at a low temperature (0° C.) | E | G | E | U | P |

As seen in Table 1, in Example 5 where only the stearates were used as the metal soap, while the rolling facility was good, the smoothness in unwinding motion was poor as indicated by the low backside adhesive strength and the result of the low temperature peeling evaluation. On the other hand, in Examples 1 to 4 where both Ca stearate and Zn laurate were used as the metal soap, while the rolling facilitation was maintained at a practically acceptable level the smoothness in unwinding motion was improved. Of them, in Examples 1 and 2 where all or half the total zinc stearate of the metal soap used in Example 5 was replaced with the laurate salt, as a result of a significant increase in the smoothness in unwinding motion in addition to the suppressed reduction in the rolling facilitation, especially high levels of rolling facilitation and smoothness in unwinding motion were achieved at the same time.

While the invention has been described in detail the described embodiments are merely examples and the invention disclosed herein includes various changes and modifications that can be made to these specific examples. For instance, though mostly discussed herein are technical effects in a PSA sheet roll the technology disclosed herein is also applicable to a PSA sheet laminate (the adhesive face of a first PSA sheet is laminated on the substrate backside of a second PSA sheet and so on). It is possible to obtain a PSA sheet laminate wherein a first layer can be removed from the laminate (peeled off from the backside of a second layer) with smooth peeling motion (equivalent to the stable, smooth unwinding motion in the PSA sheet roll).

What is claimed is:

1. A roll of a pressure-sensitive adhesive tape comprising:
(a) a polyvinyl chloride film support having first and second opposing sides and comprising:
  (i) polyvinyl chloride and
  (ii) metal soap comprising alkali earth metal soap and zinc soap, wherein the polyvinyl chloride film support contains a total of about 0.01 to 4 parts by mass of the zinc soap relative to 100 parts by mass of polyvinyl chloride, wherein at least part of the alkali earth metal soap is an alkali earth metal soap of stearic acid, and wherein the zinc soap consists of zinc laurate, and
(b) a pressure-sensitive adhesive layer provided on the first side of the polyvinyl chloride film support, wherein the adhesive layer is formed from a rubber-based pressure-sensitive adhesive composition that is an aqueous dispersion comprising natural rubber;
wherein the pressure-sensitive adhesive tape is in the form of a roll such that the pressure-sensitive adhesive layer is in contact with the second side of the polyvinyl chloride film support, and
wherein the roll of pressure-sensitive adhesive tape is capable of being unwound to bind an electrical cord.

2. The roll of claim 1, wherein the polyvinyl chloride film support contains a total of 0.15 to 2 parts by mass of the zinc soap relative to 100 parts of polyvinyl chloride.

3. The roll of claim 2, wherein the pressure-sensitive adhesive composition is a rubber-based composition comprising styrene-butadiene rubber latex.

4. The roll of claim 2, wherein the metal soap comprises calcium stearate and zinc laurate; and the amount of zinc laurate is 0.25 to 0.5 parts by mass relative to 0.5 parts by mass of calcium stearate.

5. The roll of claim 4, wherein the pressure-sensitive adhesive composition is a rubber-based composition comprising styrene-butadiene rubber latex.

6. The roll of claim 1, wherein the polyvinyl chloride film support contains a total of 0.3 to 3.5 parts by mass of the metal soap relative to 100 parts of polyvinyl chloride.

7. The roll of claim 1, wherein at least 50 mass % of the total alkali earth metal soap contained in the polyvinyl chloride film support is an alkali earth metal salt of stearic acid.

8. The roll of claim 1, wherein 30 mass % to 90 mass % of the total metal soap contained in the polyvinyl chloride film support is a stearic acid salt.

9. The roll of claim 1, wherein the polyvinyl chloride film support further comprises hydrotalcite.

10. The roll of claim 1, wherein the amount of the alkali earth metal soap of stearic acid is 0.1 to 4 parts by mass relative to 100 parts by mass of polyvinyl chloride.

11. A roll of a pressure-sensitive adhesive tape comprising:
   (a) a polyvinyl chloride film support having first and second opposing sides and comprising:
      (i) polyvinyl chloride and
      (ii) metal soap comprising alkali earth metal soap and zinc soap, wherein at least part of the alkali earth metal soap is an alkali earth metal salt of stearic acid, wherein the polyvinyl chloride film support contains 0.1 to 4 parts by mass of the alkali earth metal salt of stearic acid and 0.01 to 4 parts by mass of the zinc soap relative to 100 parts by mass of polyvinyl chloride, and wherein the zinc soap consists of zinc laurate, and
   (b) a pressure-sensitive adhesive layer provided on the first side of the polyvinyl chloride film support, wherein the adhesive layer is formed from a rubber-based pressure-sensitive adhesive composition that is an aqueous dispersion comprising natural rubber;
   wherein the pressure-sensitive adhesive tape is in the form of a roll such that the pressure-sensitive adhesive layer is in contact with the second side of the polyvinyl chloride film support, and
   wherein the roll of pressure-sensitive adhesive tape is capable of being unwound to bind an electrical cord.

12. The roll of claim 11, wherein the polyvinyl chloride film support contains a total of 0.15 to 2 parts by mass of the zinc soap relative to 100 parts of polyvinyl chloride.

13. The roll of claim 12, wherein the pressure-sensitive adhesive composition is a rubber-based composition comprising styrene-butadiene rubber latex.

14. The roll of claim 12, wherein the metal soap comprises calcium stearate and zinc laurate; and the amount of zinc laurate is 0.25 to 0.5 parts by mass relative to 0.5 parts by mass of calcium stearate.

15. The roll of claim 14, wherein the pressure-sensitive adhesive composition is a rubber-based composition comprising styrene-butadiene rubber latex.

16. The roll of claim 11, wherein the polyvinyl chloride film support contains a total of 0.3 to 3.5 parts by mass of the metal soap relative to 100 parts of polyvinyl chloride.

17. The roll of claim 11, wherein at least 50 mass % of the total alkali earth metal soap contained in the polyvinyl chloride film support is an alkali earth metal salt of stearic acid.

18. The roll of claim 11, wherein 30 mass % to 90 mass % of the total metal soap contained in the polyvinyl chloride film support is a stearic acid salt.

19. The roll of claim 11, wherein the polyvinyl chloride film support further comprises hydrotalcite.

* * * * *